(12) United States Patent
Bensing et al.

(10) Patent No.: US 7,877,905 B2
(45) Date of Patent: Feb. 1, 2011

(54) PLASTIC SHOE PROVIDED WITH DECORATION AND METHOD OF MANUFACTURING USING CASTING MOLD

(75) Inventors: Willi Bensing, Schluechtern-Kressenbach (DE); Karl-Heinrich Herber, Sinntal-Mottgers (DE)

(73) Assignee: ALSA GmbH, Steinau-Uerzell (DE)

(*) Notice: Subject to any disclaimer, the term of this patent is extended or adjusted under 35 U.S.C. 154(b) by 968 days.

(21) Appl. No.: 11/585,542

(22) Filed: Oct. 24, 2006

(65) Prior Publication Data
US 2007/0101619 A1    May 10, 2007

(30) Foreign Application Priority Data
Oct. 24, 2005    (DE) .................... 10 2005 051 155

(51) Int. Cl.
*A43B 23/00* (2006.01)
(52) U.S. Cl. .................... 36/136; 36/11.5; 12/146 C
(58) Field of Classification Search ............ 36/11.5, 36/136, 132, 45, 112; 12/146 C, 142 R
See application file for complete search history.

(56) References Cited

U.S. PATENT DOCUMENTS 3,568,339 A    3/1971    Hara et al.

| 2003/0233771 | A1 | 12/2003 | Soon et al. |
| 2004/0103562 | A1* | 6/2004 | Chaigne ..................... 36/117.1 |
| 2004/0168357 | A1* | 9/2004 | Meibock ...................... 36/115 |
| 2005/0104250 | A1 | 5/2005 | Chaigne et al. |
| 2005/0223602 | A1* | 10/2005 | Cagliari ...................... 36/136 |

FOREIGN PATENT DOCUMENTS

| CN | 15 65 837 A1 | 1/2005 |
| DE | 29 30 807 A1 | 2/1981 |
| DE | 84 06 746 U1 | 6/1984 |
| DE | 201 12 431 U1 | 11/2001 |
| EP | 1 403 032 A1 | 3/2004 |
| EP | 1 574 144 A1 | 9/2005 |
| FR | 2 847 433 | 5/2004 |

* cited by examiner

*Primary Examiner*—Ted Kavanaugh
(74) *Attorney, Agent, or Firm*—Crowell & Moring LLP

(57) ABSTRACT

A plastic shoe provided with a decoration, a method of manufacturing the shoe, and a casting mold for manufacturing the shoe, is disclosed. The decoration is printed on a polyurethane decorative film which is applied to the surface of the upper part of the plastic shoe with the printed side facing down. To do so, the upper shell of a conventional casting mold is provided on the inside with a fine-pored aluminum foam body to produce plastic shoes. The aluminum foam body is connected to a suction pump. The decorative film is held in the casting mold with the help of the vacuum thereby generated.

16 Claims, 2 Drawing Sheets

PLASTIC SHOE PROVIDED WITH DECORATION AND METHOD OF MANUFACTURING USING CASTING MOLD

This application claims the priority of German Patent Document No. 10 2005 051 155.4, filed Oct. 24, 2005, the disclosure of which is expressly incorporated by reference herein.

BACKGROUND AND SUMMARY OF THE INVENTION

The invention relates to a plastic shoe with a decoration, in particular in the form of a clog having a sole and an upper part attached to the sole.

German Patent Document No. DE 84 06 746 U1 describes a plastic boot, the shaft of which is produced from a transparent plastic by injection molding. On the inside of the shaft there is a layer of reflective material which has warning functions, but can also be seen as decorative.

Since the decorative layer is provided on the inside, the effect of the layer is lost when the shaft material becomes cloudy over a period of time due to environmental influences. Furthermore, such a layer may be attached to the intended site only by a complex procedure.

The invention is thus based on the objective of providing a plastic shoe with a long-lasting decorative layer that remains readily visible over the lifetime of the shoe and is also easy to apply.

To attain this objective, the invention provides for a decorative film to be attached to the surface of the top side of the upper part.

As explained below, such a film is easily applied. It serves only as a carrier of the decoration and therefore may be designed to be very thin. A typical thickness is 0.2 to 0.3 mm.

The decoration is preferably applied by printing on the side of the decorative film facing the upper part. Thus the decorative printing on the shoe is protected between the film and the upper part.

An especially intimate connection between the film and the upper part is obtained if the film and upper part are both made of the same material, e.g., polyurethane.

The shoe itself is made of foamed polyurethane while the film is designed to be impervious and thus also covers the shoe in a waterproof layer.

The connection between the plastic material of the decorative film and the upper part is established by heating the plastic material of the upper part during foaming so that the bond between the decorative film and the upper part may be maintained without the use of adhesive.

The invention also relates to a method for producing a shoe, where the sole and the upper part are produced by introducing and foaming the shoe material in a casting mold consisting of at least one upper shell and one lower shell, where the inside of the upper shell forms the contour of the top side of the upper part.

This is a typical manufacturing process for a plastic shoe in the form of a clog, among other things. The sole and the upper part typically form a unit and are manufactured in one operation.

The production of such a shoe with an additional footbed made of a cork-rubber mixture is described in German Patent Document No. DE 201 12 431 U1.

The invention is thus based on the objective of supplementing the manufacturing process so that the shoe is provided with a decorative film applied to the outside in the simplest possible way.

To attain this objective, the invention provides for the decorative film to be arranged on the inside of the upper shell before introducing the shoe material.

The manufacturing process described above must therefore be supplemented by adding just one step, namely the arrangement of the decorative film on the upper shell. The other steps remain unchanged. During the foaming of the material of the upper part, the decorative film forms a surface bond with the upper part.

To ensure a secure and wrinkle-free hold of the decorative film to the upper shell, it is provided that the decorative film be held on the inside of the upper shell by means of a vacuum.

Therefore, a suction device generating the vacuum is used. The suction device has a fine-pored air-permeable metal foam molded body, preferably made of aluminum, forming at least the inner layer of the upper mold. For surface contact with the decorative film, the metal foam molded body extends beyond the decorative film, so it may be held against the metal foam molded body by vacuum over the full area.

In order for the decorative film to be able to adapt to the shape of the upper shell, the decorative film is heated, e.g., to 80° C., before applying it to the upper shell.

The invention will be explained in greater detail below on the basis of an exemplary embodiment.

DETAILED DESCRIPTION OF THE DRAWINGS

Figure 1:
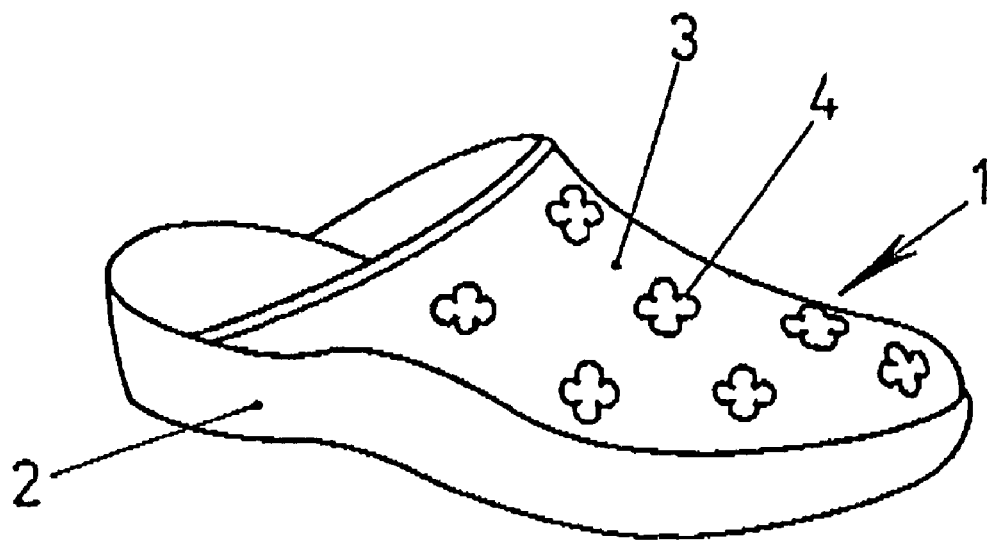
FIG. 1 shows a perspective view of a clog made of plastic.

Reference is first made to FIG. 1. It shows a plastic shoe 1 in the form of a clog. The shoe 1 consists of a sole 2 and an upper part 3 that is provided with a decoration.

Figure 2:
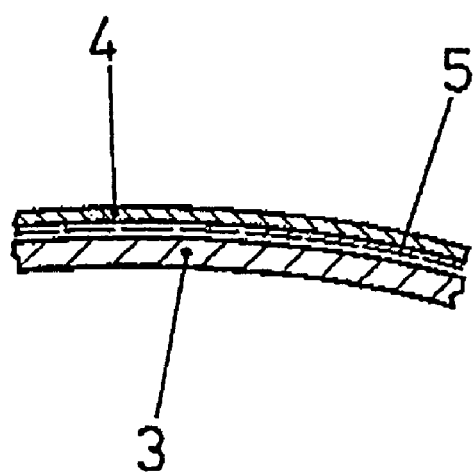
FIG. 2 shows a cross-section through the structure of the upper part of the clog.

FIG. 2 shows a cross-section through the structure of the upper part 3 of the clog. The upper part 3 itself is made of a foamed PU material to which is applied a transparent decorative film 4 that is 0.2 to 0.3 mm thick and is also made of a PU material. A very thin printed layer 5 designed according to the desired decoration is provided in between. The upper part 3 and the decorative film 4 are bonded together intimately over the surface without the use of adhesive.

Figure 3:
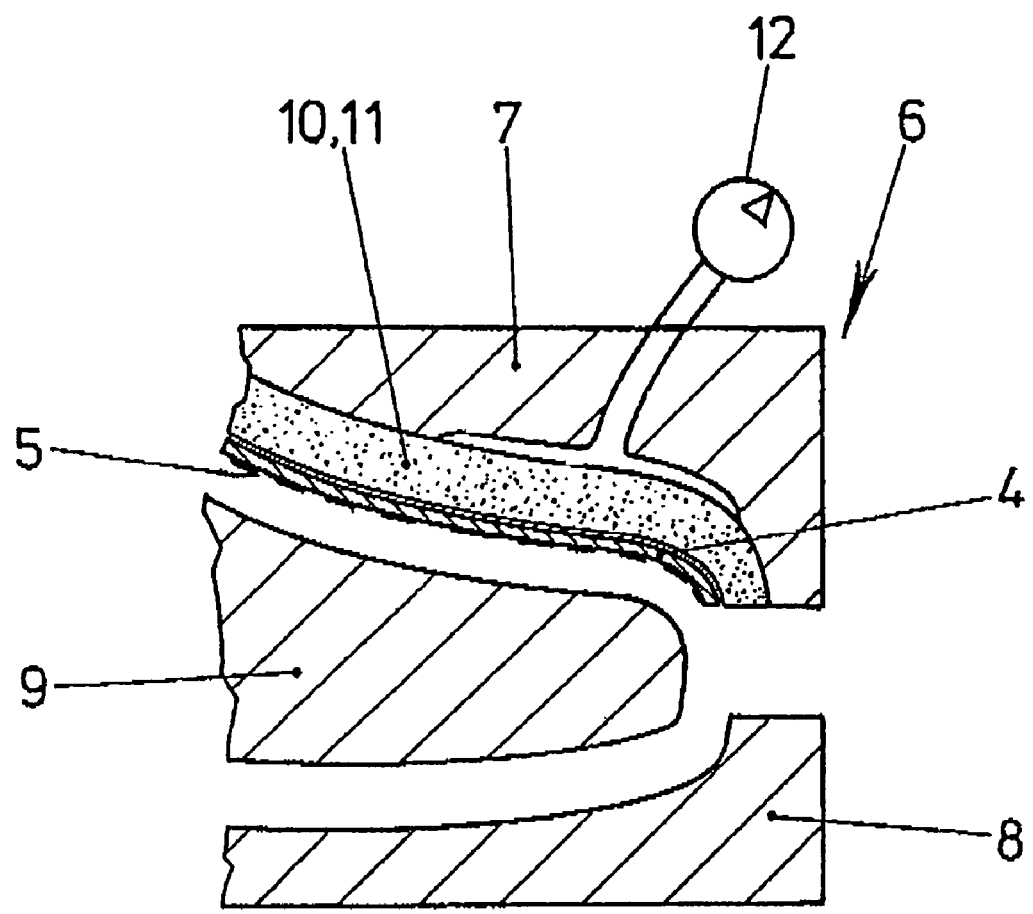
FIG. 3 shows a schematic cross-sectional diagram of a casting mold for producing a clog according to FIG. 1.

FIG. 3 shows schematically an arrangement for manufacturing a shoe according to FIG. 1. A casting mold 6 consists of an upper shell 7, a lower shell 8 and a core 9, which enclose in a closed form a cavity into which a plastic material is injected and/or introduced and foamed to form a shoe 1. According to this invention, the upper shell 7 and/or at least its inner layer 10 is made of a fine-pored metal foam molded body 11 of aluminum foam that is connected to a suction pump 12.

The following procedure is used to apply the decorative film. A decorative film 4 made of polyurethane printed on one side with the desired pattern is first cut to size, then heated slightly and next introduced into the open mold and applied to the surface of the metal foam molded body 11, with the print on the outside. The vacuum created by the pump 12 in the metal foam molded body 11 holds the decorative film 4 on its bottom side. Since the decorative film 4 has first been heated, it conforms to the shape of the metal foam molded body 11 without wrinkles.

Then the mold is closed as usual and the shoe itself is manufactured as usual. In doing so, the decorative film bonds to the material of the upper part 3 without requiring the use of an adhesive or any other binder.

LIST OF REFERENCE NUMERALS

1 Plastic shoe
2 Sole
3 Upper part
4 Decorative film
5 Printed layer
6 Casting mold
7 Upper shell
8 Lower shell
9 Core
10 Inner layer
11 Metal foam molded body
12 Suction pump The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A plastic shoe, in particular in a form of a clog, comprising a sole and an upper part that is joined to the sole, wherein a decorative film is attached to a surface on a top side of the upper part, wherein a decoration is printed on a side of the decorative film facing the upper part, and wherein the decorative film is made of a same material as the upper part.

2. The plastic shoe according to claim 1, wherein the material is a polyurethane.

3. The plastic shoe according to claim 1, wherein a bond between the decorative film and the upper part is free of an adhesive.

4. The plastic shoe according to claim 1, wherein the top side of the upper part is an outside of the upper part.

5. The plastic shoe according to claim 4, wherein the decorative film has a thickness of between approximately 0.2 to 0.3 mm.

6. The plastic shoe according to claim 1, wherein the upper part is made of a foamed polyurethane.

7. A method for manufacturing a shoe having a sole and an upper part that is joined to the sole, wherein a decorative film is attached to a surface on a top side of the upper part, wherein a decoration is printed on a side of the decorative film facing the upper part, and wherein the decorative film is made of a same material as the upper part, comprising the sole and the upper part are produced by introducing a shoe material into a casting mold and foaming it there, the casting mold consisting of at least one upper shell and one lower shell, wherein an inside of the upper shell forms a contour of the top side of the upper part, and wherein the decorative film is arranged on the inside of the upper shell before introducing the shoe material.

8. The method according to claim 7, wherein the decorative film is held on the inside of the upper shell by a vacuum.

9. The method according to claim 8, wherein a suction device generating the vacuum has a fine-pored air-permeable metal foam molded body that forms an inner layer of the upper shell.

10. The method according to claim 9, wherein the metal foam molded body is made of aluminum.

11. The method according to claim 7, wherein the decorative film is heated before applying it to the upper shell.

12. The method according to claim 7, wherein the top side of the upper part is an outside of the upper part.

13. The method according to claim 12, wherein the decorative film has a thickness of between approximately 0.2 to 0.3 mm.

14. The method according to claim 7, wherein the shoe material of the upper part is heated during foaming.

15. The method according to claim 7, wherein the decorative film is attached to the surface on the top side of the upper part without a use of an adhesive.

16. The method according to claim 7, wherein the upper part is made of a foamed polyurethane.

* * * * *